US008000546B2

(12) United States Patent
Yang et al.

(10) Patent No.: US 8,000,546 B2
(45) Date of Patent: Aug. 16, 2011

(54) ADAPTIVE SCAN METHOD FOR IMAGE/VIDEO CODING

(75) Inventors: Jar-Ferr Yang, TaiNan (TW); Yung-Chiang Wei, TaiNan (TW)

(73) Assignee: National Cheng Kung University, Tainan (TW)

( * ) Notice: Subject to any disclaimer, the term of this patent is extended or adjusted under 35 U.S.C. 154(b) by 462 days.

(21) Appl. No.: 12/184,269

(22) Filed: Aug. 1, 2008

(65) Prior Publication Data

US 2010/0027902 A1 Feb. 4, 2010

(51) Int. Cl.
  *G06K 9/36* (2006.01)
(52) U.S. Cl. .............. 382/239; 375/240.02; 375/240.18; 382/238; 382/248; 382/250
(58) Field of Classification Search ............. 375/240.18, 375/240.02; 382/238, 239, 248
  See application file for complete search history.

(56) References Cited

U.S. PATENT DOCUMENTS

| | | | | |
|---|---|---|---|---|
| 5,452,104 A | * | 9/1995 | Lee | 358/426.14 |
| 5,488,570 A | * | 1/1996 | Agarwal | 345/501 |
| 5,500,678 A | * | 3/1996 | Puri | 348/408.1 |
| 5,508,942 A | * | 4/1996 | Agarwal | 709/204 |
| 5,790,706 A | * | 8/1998 | Auyeung | 382/248 |
| 5,926,574 A | * | 7/1999 | Nishikawa et al. | 382/239 |
| 5,937,098 A | * | 8/1999 | Abe | 382/239 |
| 6,055,017 A | * | 4/2000 | Shen et al. | 375/240.11 |
| 6,680,975 B1 | * | 1/2004 | Jeong et al. | 375/240.23 |
| 7,218,788 B2 | * | 5/2007 | Igarashi et al. | 382/239 |
| 7,702,013 B2 | * | 4/2010 | Schwarz et al. | 375/240.02 |
| 2005/0213835 A1 | * | 9/2005 | Guangxi et al. | 382/250 |
| 2006/0133509 A1 | * | 6/2006 | Schwartz | 375/240.18 |
| 2006/0146936 A1 | * | 7/2006 | Srinivasan | 375/240.18 |
| 2006/0159357 A1 | * | 7/2006 | Mizuno | 382/239 |
| 2007/0019875 A1 | * | 1/2007 | Sung et al. | 382/239 |
| 2008/0298702 A1 | * | 12/2008 | Gunupudi et al. | 382/251 |
| 2008/0310504 A1 | * | 12/2008 | Ye et al. | 375/240.02 |
| 2008/0310512 A1 | * | 12/2008 | Ye et al. | 375/240.16 |
| 2008/0310745 A1 | * | 12/2008 | Ye et al. | 382/238 |
| 2009/0041128 A1 | * | 2/2009 | Howard | 375/240.24 |
| 2009/0046941 A1 | * | 2/2009 | Mietens et al. | 382/250 |
| 2010/0290520 A1 | * | 11/2010 | Kamisli et al. | 375/240.2 |

OTHER PUBLICATIONS

Thomas Wiegand, Gary J. Sullivan, Gisle Bjontegaard and Ajay Luthra, "Overview of the H.264/AVC Video Coding Standard", IEEE Transactions on Circuits and Systems for Video Technology, vol. 13, No. 7, p. 560-576, Jul. 2003.*

Yung-Chiang Wei and Jar-Ferr Yang, "Adaptive mode-dependent scan for H.264/AVC intracoding", Journal of Electronic Imaging 19(3), 033008 p. 1-12, Jul.-Sep. 2010.*

\* cited by examiner

*Primary Examiner* — Vu Le
*Assistant Examiner* — Xuemei Chen
(74) *Attorney, Agent, or Firm* — Rabin & Berdo, P.C.

(57) ABSTRACT

An adaptive scan method for image/video coding in accordance with the present invention comprises acts of calculating an average power of the transformed coefficients vector and acts rearranging the powers of the transformed coefficients with descending order in the data block according to the power of transformed coefficients; Therefore, the adaptive scan method is dependent on different prediction mode witch has been coded in H.264 standard, and provides better rate-distortion performance in entropy coding to the conventional zig-zag scan.

4 Claims, 2 Drawing Sheets

ADAPTIVE SCAN METHOD FOR IMAGE/VIDEO CODING

FIELD OF THE INVENTION

The present invention relates to a scan method for image/video coding, especially to an adaptive scan method for H.264 intra coding.

DESCRIPTION OF THE RELATED ART

A conventional H.264 is a video coding standard better than other video coding standards such as MPEG-2 and MPEG-4 due to the adaptation of advanced coding features, including a spatial prediction in intra coding, a variable block size motion compensation, a 4×4 integer transform, a multiple reference pictures and context-adaptive variable length coding (CAVLC), and an intra coding is one of the key features that contribute to the success of H.264 coding, comprising a 4×4 block intra prediction and a 16×16 block intra prediction.

In the H.264 intra coding, the H.264 conducted in the transform domain intra prediction in a spatial domain, and there are 9 prediction modes for each 4×4 luminance block and 4 prediction modes for each 16×16 luminance block or each 8×8 chrominance block.

With reference to FIG. 1, a well known scan method for the H.264 coding standard is a zig-zag scan.

Generally, a transformed coefficients after a discrete cosine transform (DCT) transform due to spatial redundancy will be statistically decreased from top-left to bottom-right in a two-dimensional coefficients transformed blocks, and the zig-zag scan transfers the two-dimensional transform coefficients into one-dimensional data in descending order and helps to achieve efficient entropy coding. Consequently, if the redundancy is always statistically decreased, the zig-zag scan of the transformed blocks will achieve the best entropy coding performance.

However, in the intra prediction of the H.264 intra coding, the statistical activities of the residuals are changed after the intra prediction of the H.264 intra coding, and the transform coefficients are no longer statistically decreased. In other words, we need to find an adaptive scan method that improves the H.264 intra coding performance other than the conventional zig-zag scan.

SUMMARY OF THE INVENTION

A primary object of the present invention is to provide better scan method with the statistically decreased order of magnitudes of coefficients, especially to the improvement of the coding performance other than the conventional zig-zag scan.

The adaptive scan method for image/video coding in accordance with the present invention comprises acts of calculating an average power of the transformed coefficients vector and acts rearranging the powers of the transformed coefficients with descending order in the n×n block according to the power of transformed coefficients, wherein $n=2^m$, and the n and m are positive integers; Therefore, the adaptive scan method is dependent on intra prediction mode which has been coded in H.264 intra coding, and provides better rate-distortion performance in an context-adaptive variable length coding to the conventional zig-zag scan.

BRIEF DESCRIPTIONS OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PRESENT INVENTION

An adaptive scan method for image/video coding in accordance with the present invention comprises acts of calculating an average power of the transformed coefficients vector and acts rearranging the powers of the transformed coefficients with descending order in the n×n block, wherein $n=2^m$, and the n and m are positive integers, and the n×n block may be a 4×4 block, according to the power of transformed coefficients.

The acts of calculating an average power of the transformed coefficients vector, and the calculation of the average power of the transformed coefficients vector further comprises acts of modeling a spatial data and acts of modeling a predictive data.

Figure 1:
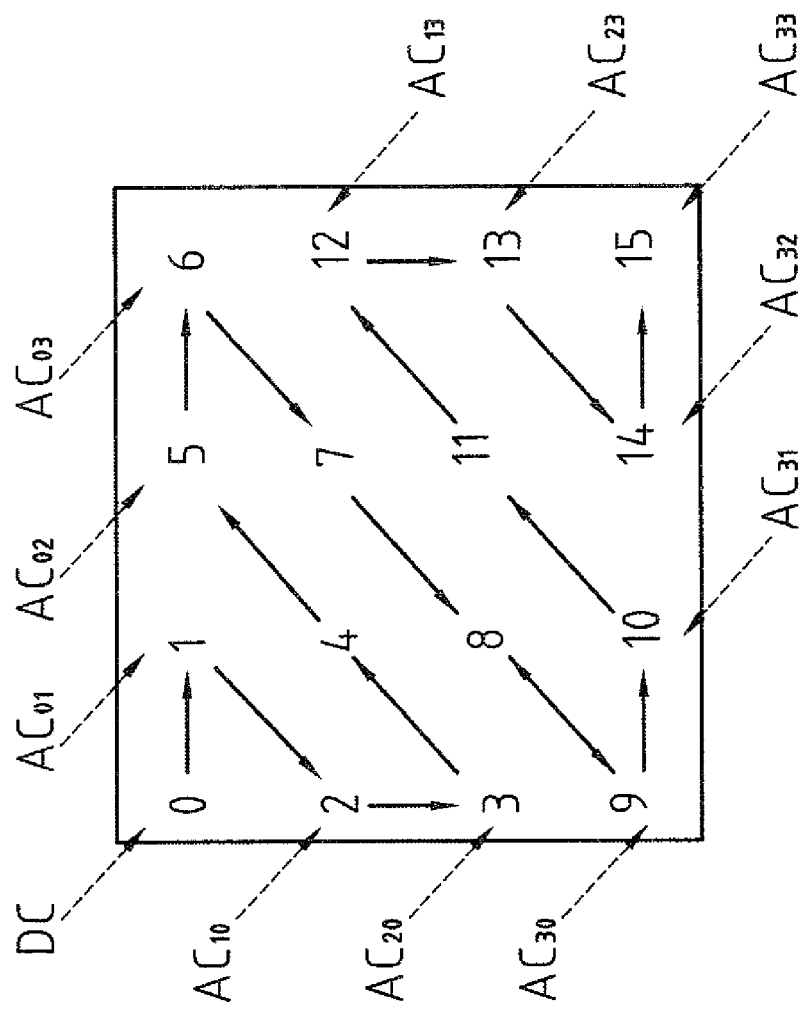
FIG. 1 is a diagram illustrating zig-zag scan order for 4×4 blocks.
Figure 2:
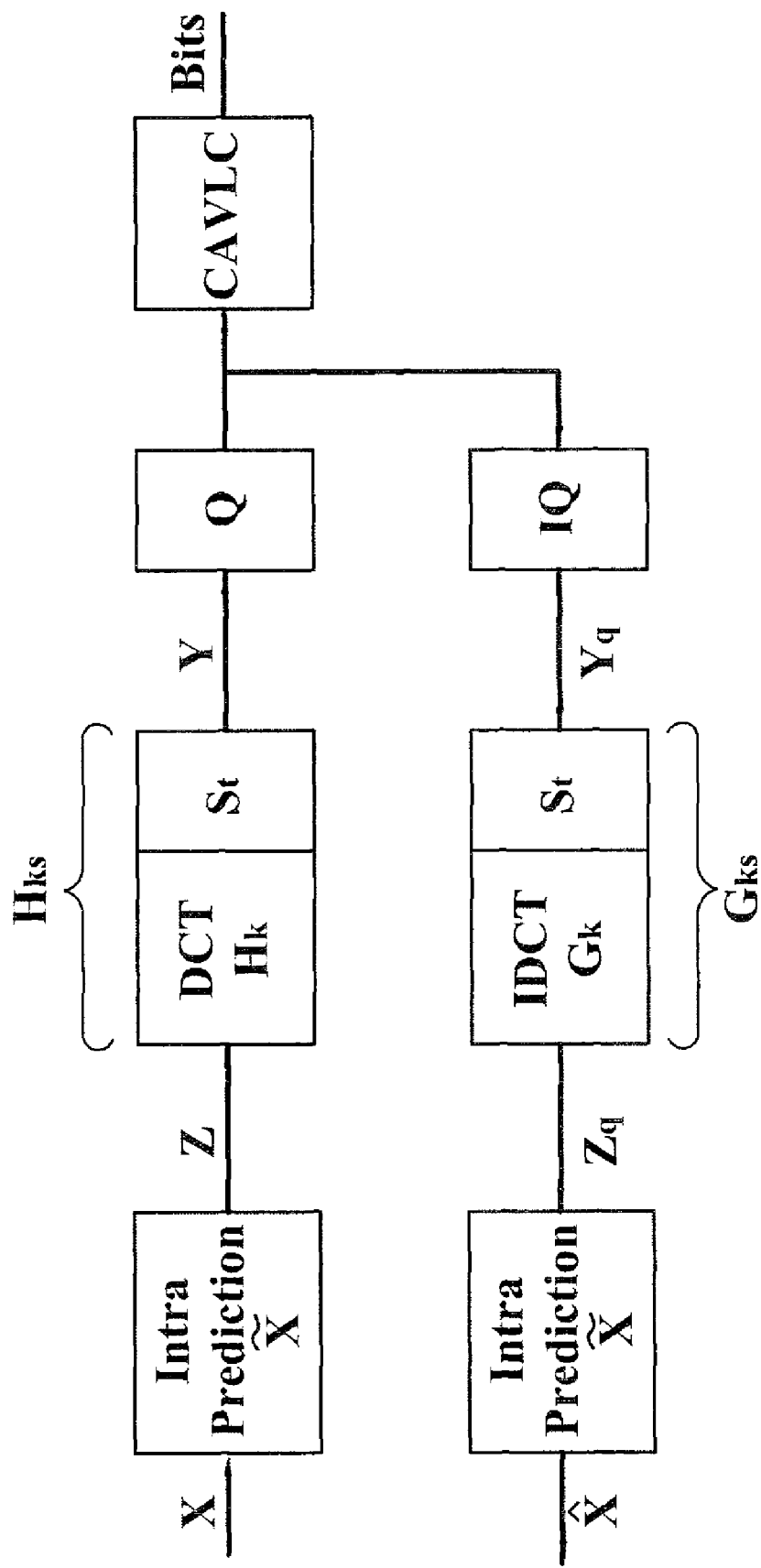
FIG. 2 shows intra-prediction modes defined in H.264.

With reference to FIG. 2, according to the conventional H.264 intra coding of a 4×4 block, the procedure of the H.264 intra coding comprises: a coding block (X) is first performed intra prediction to obtained the a residual block (Z), and; the residual block (Z) is integer discrete cosine transform (DCT) and post scaling transformed to get a transform block (Y).

Therefore, the acts of calculating the average power of the transformed coefficients vector in accordance with the present invention. The average power of transformed coefficients vector, wherein a transformed coefficients vector (y) is obtained from the transform block (Y).

According to the intra prediction defined in H.264 intra coding, the residual block Z is expressed as, $$Z = X - \tilde{X}^J$$

wherein $\tilde{X}^J$ denotes the prediction block for Mode J, where J=0, 1, 2, ..., 8. The residual block Z is transformed by integer transform and post-scaling, and then quantized.

Since the transform block (Y) is obtained from the residual block (Z), therefore, the transformed block (Y) is $$Y = (HZH^T) \cdot * S_f,$$

where H is the integer transform defined in H.264 standard and given as $$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

and $S_f$ is the post-scaling factor matrix depicted as $$S_f = \begin{bmatrix} 0.2500 & 0.1581 & 0.2500 & 0.1581 \\ 0.1581 & 0.1000 & 0.1581 & 0.1000 \\ 0.2500 & 0.1581 & 0.2500 & 0.1581 \\ 0.1581 & 0.1000 & 0.1581 & 0.1000 \end{bmatrix}$$

and the superscript "$T$" represents the transpose of the matrix and the operator, ".*", denotes the element-by-element multiplication in their corresponding indices.

When the transformed block (Y) is give and transferring the transformed block (Y) into a transformed coefficient vector (y) by $$vec(Y)=(H_K \cdot vec(Z)) \cdot {}^*vec(S_f).$$

Where the function vec(Y) and vec($S_f$) denotes a 16×1 column vector, which is a concatenation of row-ordered vectors of the argument matrix, for example:

$$vec(Z)=(z_{1,1}, z_{1,2}, z_{1,3}, z_{1,4}, z_{2,1}, z_{2,2}, \ldots, z_{4,3}, z_{4,4})^T$$

and the transform matrix $H_K$ with dimension 16×16 is defined as $$H_K = H \otimes H,$$

where the operator "$\otimes$" represents Kronecker product.

For simplifying the notations, where y=vec(Y), and the transformed coefficient vector (y) can be expressed by $y=(H_K \cdot z) \cdot {}^*s_f$.

Therefore, the average power of the k-th transformed coefficient vector y can be statistically expressed by $$\phi_y(k) = E[y^2(k)] = \sum_{m=1}^{16} \sum_{n=1}^{16} H_K(k,m) H_K(k,n) \cdot E[z(m)z(n)] \cdot s_f^2(k).$$

Accordingly to the average power of the k-th transformed coefficient vector (y) above-mentioned, a autocorrelation function z(n)

$$E[z(m)z(n)] = E[(x(m) - \tilde{x}^J(m)) \cdot (x(n) - \tilde{x}^J(n))]$$
$$= E[x(m)x(n)] - E[x(m)\tilde{x}^J(n)] - E[\tilde{x}^J(m)x(n)] + E[\tilde{x}^J(m)\tilde{x}^J(n)]$$

and $\tilde{x}^J(m)$ denotes the $m^{th}$ element of $\tilde{x}^J$ since the other parameters $H_K(k,m)$ and $s_f(k)$ are known, and build a statistical model of x that compute all correlation functions.

$E[x(m)x(n)], E[x(m)\tilde{x}^J(n)], E[\tilde{x}^J(m)x(n)],$
and $E[\tilde{x}^J(m)\tilde{x}^J(n)]$ before compute the autocorrelation function of z(n).

The correlation functions are position-dependent to avoid physical spatial position of each index m. The left-top pixel of the current block X positioned at (0, 0) and the corresponding spatial positions related to all m indices are depicted as:

$m=1 \to (0,0); m=2 \to (0,1); m=3 \to (0,2); m=4 \to (0,3);$ $m=5 \to (1,0); m=6 \to (1,1); m=7 \to (1,2); m=8 \to (1,3);$ $m=9 \to (2,0); m=10 \to (2,1); m=11 \to (2,2); m=12 \to (2,3);$ $m=13 \to (3,0); m=14 \to (3,1); m=15 \to (3,2); m=16 \to (3,3);$ the positions of surrounding coded pixel in the upper and left blocks used for prediction are stated as $A \to (-1,0); B \to (-1,1); C \to (-1,2); D \to (-1,3);$ $E \to (-1,4); F \to (-1,5); G \to (-1,6); H \to (-1,7);$ $I \to (0,-1); J \to (1,-1); K \to (2,-1); L \to (3,-1);$ $M \to (-1,-1);$ p(m) for m=1, 2, . . . , 16, to represent the spatial position of the $m^{th}$ element. For example, p(1)=(0, 0), p(2)=(0, 1), . . . , p(16)=(3, 3). Consequently, we will use p(a) for a=A, B, . . . , M to represent the position of the surrounding coded pixel such as p(A)=(−1, 0), p(B)=(−1, 1), . . . , p(M)=(−1, −1).

The acts of modeling a spatial data is to solve the E[x(m)x(n)].

Considering the covariance of pixels x(m) and x(n), which is defined as $$Cov[x(m),x(n)]=E[(x(m)-\mu_{X(m)}) \cdot (x(n)-\mu_{X(n)})] = E[x(m)x(n)] - \mu_{X(m)}\mu_{X(n)},$$

and an assumption that the pixel values in a coding block arranged in the row order form a stationary random vector, i.e., $x=(x(1), x(2), \square, x(16))^T$, it is well-known that $\mu_X=E[x(m)]$, therefore, $$E[x(m)x(n)]=Cov[x(m),x(n)]+\mu_X^2.$$

For a stationary random vector, $\sigma_X^2=Cov[x(m), x(m)]$ for all m. Based on the 1-D first-order Markov model:

$$Cov[X(j,i),X(j,i+s)]=\sigma_X^2 \rho_x^s, \text{ and;}$$

$$Cov[X(j,i),X(j+t,i)]=\sigma_X^2 \rho_y^t;$$

where $\sigma_X$ and $\rho_y^t$ denote the horizontal and vertical correlation coefficients with one-pixel displacement, respectively. In this embodiment, we simplify the 2-D first-order Markov model as $$Cov[X(j,i),X(j+t,i+s)]=\sigma_X^2 \cdot \rho_y^t \cdot \rho_x^s.$$

Hence, the covariance function in (16) generally can be expressed as $$\sigma_X^2(m,n)=Cov[x(m),x(n)]= \sigma_X^2 \rho_x^{|p_x(m)-p_x(n)|} \rho_y^{|p_y(m)-p_y(n)|},$$

where $p_x(m)$ and $p_y(m)$ represent the horizontal and vertical elements of spatial position vector, p(m) respectively. Thus, the 16×16 covariance matrix finally can be expressed by $$K_X = \sigma_X^2 \begin{bmatrix} 1 & \rho_y & \rho_y^2 & \rho_y^3 \\ \rho_y & 1 & \rho_y & \rho_y^2 \\ \rho_y^2 & \rho_y & 1 & \rho_y \\ \rho_y^3 & \rho_y^2 & \rho_y & 1 \end{bmatrix} \otimes \begin{bmatrix} 1 & \rho_x & \rho_x^2 & \rho_x^3 \\ \rho_x & 1 & \rho_x & \rho_x^2 \\ \rho_x^2 & \rho_x & 1 & \rho_x \\ \rho_x^3 & \rho_x^2 & \rho_x & 1 \end{bmatrix}$$

the $K_x$, the computation of E[x(m)x(n)] becomes straightforward, and $$E[x(m)x(n)]=Cov[x(m),x(n)]+\mu_X^2 = \sigma_X^2 \rho_x^{|p_x(m)-p_x(n)|} \rho_y^{|p_y(m)-p_y(n)|} + \mu_X^2.$$

The acts of modeling a predictive data is to solve E[x(m)$\tilde{x}^J(n)$], E[$\tilde{x}^J(m)x(n)$], and E[$\tilde{x}^J(m)\tilde{x}^J(n)$].

For Mode J in the predictive data, $\tilde{x}^J(m)$ can be generally expressed by a linear combination of one, two, or three decoded values from A, B, . . . , and M in the left and the upper blocks as $$\tilde{x}^J(m) = \sum_{\text{all } a_m^J} w_{a_m^J} \hat{x}(p(a_m^J)), a_m^J \in \{A, B, \ldots, M\}$$

wherein $p(a_m^J)$ denotes the position of $a_m^J$, which is one of A, B, . . . , and M, used in the prediction and $w_J$ is a weighting factor, which is defined in H.264, for referred position $p(a_m^J)$ to predict x(m). It is noted that $\hat{x}(p(a_m^J))$ denotes the reconstructed pixel at the position $p(a_m^J)$ and using the first order Markov model to analyze the predictive data, the physical displacement of the positions of the predicted pixel and the target pixel is very important. The reconstructed pixels used for intra prediction can be modeled as $$\hat{x}(p(a_m^J))=x(p(a_m^J))+e(p(a_m^J)),$$

where $e(p(a_m^J))$ denotes the quantization error in the spatial domain at position $p(a_m^J)$. Assume that the quantization error is a zero mean Gaussian process and independent of spatial data such that $$E[x(m)e(p(a_n^J))]=E[x(m)]\cdot E[e(p(a_n^J))]=0$$

and $$E[e(p(a_m^J))e(p(a_n^J))] = \begin{cases} \sigma_e^2(m), & \text{if } a_m^J = a_n^J \\ 0, & \text{if } a_m^J \neq a_n^J \end{cases}.$$

It is noted that the quantization error $e(p(a_m^J))$ is produced from the quantization of transformed coefficient by using quantization step (Qstep). The analysis of $e(p(a_m^J))$ should be further addressed such that we can statistically estimate the noise power $\sigma_e^2$ precisely.

the intra-prediction residual is $$Z=X-\tilde{X}$$

and the reconstruction block is given by $$\hat{X}=Z_q+\tilde{X}.$$

The reconstruction error $e(p(a_m^J))$ is equal to the quantization error of residual, that is, $$e(p(a_m^J))=z_q(p(a_m^J))-z(p(a_m^J))$$

which is contributed by the quantization of transformed coefficients as $$e_y(k)=y_q(k)-y(k), k=1, 2, \ldots, 16.$$

And reconstruct residual block as $$z_q=vec(Z_q)=G_K(vec(Y_q)\cdot *vec(S_i))$$

where the inverse 2-D transform matrix $G_K$ is Kronecker product of G as $$G_K = G \otimes G, \text{ where}$$

$$G = \begin{bmatrix} 1 & 1 & 1 & 1/2 \\ 1 & 1/2 & -1 & -1 \\ 1 & -1/2 & -1 & 1 \\ 1 & -1 & 2 & -1/2 \end{bmatrix}.$$

To simplify the representation, we combine the scaling factor $S_i$ into inverse transform matrix $G_K$ $$z_q=vec(Z_q)=G_{KS}\cdot y_q$$

Thus, the reconstructed residual for the $m^{th}$ element becomes $$z_q(m) = \sum_{k=1}^{16} G_{KS}(m, k)y_q(k)$$

and $y = (H_{KS} \cdot z)$ and combining scaling factor $S_f$ into transformation matrix $G_K$.

Since $G_{KS}=H_{KS}^T$, the power of the quantization error in spatial domain can be expressed by $$E[e^2(m)] = E[(\hat{x}(m) - x(m))^2] = E[(z_q(m) - z(m))^2]$$

$$= E\left[\left(\sum_{k=1}^{16} G_{KS}(m, k)(y_q(k) - y(k))\right)^2\right]$$

$$= E\left[\left(\sum_{k=1}^{16} H_{KS}(k.m)(y_q(k) - y(k))\right)^2\right]$$

$$= E\left[\left(\sum_{k=1}^{16} H_{KS}(k, m)e_y(k)\right)^2\right]$$

$$= E\left[\sum_{k=1}^{16} H_{KS}(k, m)e_y(k) \cdot \sum_{l=1}^{16} H_{KS}(l, m)e_y(l)\right]$$

$$= \sum_{k=1}^{16}\sum_{l=1}^{16} H_{KS}(k, m)H_{KS}(l, m)E[e_y(k)e_y(l)].$$

Assume that the quantization errors in different frequency positions are independent as $$E[e_y(k)e_y(l)]=E[e_y(k)]E[e_y(l)]=0, \text{ for } k\neq l.$$

Therefore, $$E[e^2(m)] = \sum_{k=1}^{16} H_{KS}^2(k, m)E[e_y^2(k)].$$

Thus, the relationship of quantization errors in spatial domain and in frequency domain could be precisely estimated. Since it is a uniform quantization for coefficient quantization in H.264, the mean square quantization error is $$E[e_y^2(k)] = \frac{Qstep^2}{12}$$

wherein $Q_{step}$ is the quantization step size.

and, the quantization noise power is $$\sigma_e^2(m) = \sum_{k=1}^{16} H_{KS}^2(k, m) \cdot \frac{Qstep^2}{12}, \text{ and}$$

$$E[x(m)\tilde{x}^J(n)] = E\left[x(m) \cdot \left(\sum_{a_n^J} w_{a_n^J} x(p(a_n^J)) + w_{a_n^J} e(p(a_n^J))\right)\right]$$

$$= E\left[x(m) \cdot \sum_{a_n^J} w_{a_n^J} x(p(a_n^J))\right]$$

$$= \sum_{a_n^J} w_{a_n^J} E[x(m)x(p(a_n^J))]$$

$$= \sum_{a_n^J} w_{a_n^J} \left(\sigma_x^2 \rho_x^{|p_x(m)-p_x(a_n^J)|} \rho_y^{|p_y(m)-p_y(a_n^J)|} + \mu_x^2\right).$$

Since the quantization noise $e(p(a_n^J))$ is independent of spatial data $x(m)$, we can directly let $E[x(m)e(p(a_n^J))]=0$. By using spatial data modeling $E[\tilde{x}^J(m)x(n)]$, which is written as $$E[\tilde{x}^J(m)x(n)] = \sum_{a_m^J} w_{a_m^J}\left(\sigma_X^2 \rho_x^{|p_x(a_m^J)-p_x(n)|} \rho_y^{|p_y(a_m^J)-p_y(n)|} + \mu_X^2\right).$$

Finally, we can use the spatial data model and noise model to compute $E[\tilde{x}^J(m)\tilde{x}^J(n)]$ as $$E[\tilde{x}^J(m)\tilde{x}^J(n)] = E\left[\left(\sum_{a_m^J} w_{a_m^J}(x(p(a_m^J)) + e(p(a_m^J)))\right) \cdot \right.$$

$$\left(\sum_{a_n^J} w_{a_n^J}(x(p(a_n^J)) + e(p(a_n^J)))\right]$$

$$= E\left[\sum_{a_m^J}\sum_{a_n^J} w_{a_m^J} w_{a_n^J} x(p(a_m^J))x(p(a_n^J)) + \right.$$

$$\sum_{a_m^J}\sum_{a_n^J} w_{a_m^J} w_{a_n^J} e(p(a_m^J))e(p(a_n^J))\right]$$

$$= \sum_{a_m^J}\sum_{a_n^J} w_{a_m^J} w_{a_n^J}\left(\sigma_X^2 \rho_x^{|p_x(a_m^J)-p_x(a_n^J)|}\rho_y^{|p_y(a_m^J)-p_y(a_n^J)|} + \mu_X^2\right) +$$

$$\sum_{a_m^J}\sum_{a_n^J}(w_{a_m^J})^2 \delta(a_m^J - a_n^J)\sigma_e^2(p(a_m^J)),$$

where $\delta(\alpha-\beta)=1$ if $\alpha=\beta$ and $\delta(\alpha-\beta)=0$ if $\alpha\neq\beta$.

the autocorrelation function of the residual data finally can be expressed by $$E[z(m)z(n)] = (\sigma_X^2 R_X(m,n) + \mu_X^2) - \sum_{a_n^J} w_{a_n^J}(\sigma_X^2 r_X(m, a_n^J) + \mu_X^2) -$$

$$\sum_{a_m^J} w_{a_m^J}(\sigma_X^2 r_X(a_m^J, n) + \mu_X^2) +$$

$$\sum_{a_m^J}\sum_{a_n^J} w_{a_m^J} w_{a_n^J}(\sigma_X^2 r_X(a_m^J, a_n^J) + \mu_X^2) +$$

$$\sum_{a_m^J}\sum_{a_n^J}(w_{a_m^J})^2 \delta(a_m^J - a_n^J)\sigma_e^2(p(a_m^J)),$$

where the correlation coefficient $r_X(m,n)$ is defined as $$r_X(m,n) = \rho_x^{|p_x(m)-p_x(n)|}\rho_y^{|p_y(m)-p_y(n)|}.$$

The acts of rearranging the powers of the transformed coefficients with descending order in the 4×4 block according to the power of transformed coefficients comprising:

given the values of Qstep, $\mu_X$, $\sigma_X^2$, $\rho_x$ and $\rho_y$;

use Qstep, $\mu_X$, $\sigma_X^2$, $\rho_x$ and $\rho_y$ to compute the $\phi_y(k)=E[y^2(k)]$, and;

according to the calculation results of the $\phi_y(k)=E[y^2(k)]$, derive a scan order for coefficients in descending order.

An embodiment of a scan order for mode 0 of the adaptive scan method for H.264 intra coding in accordance with the present invention.

For example, based on the acts of above-mentioned, if we give the values of Qstep=26, $\mu_X$=123, $\sigma_X^2$=470, $\rho_x$=0.6 and $\rho_y$=0.9, and through these parameters to calculate the averaged powers of transformed coefficients, and results are listed in a table below.

| Average power | Mode 0 |
|---|---|
| E[y2(1)] | 1710.4 |
| E[y2(2)] | 789.2 |
| E[y2(3)] | 506.3 |
| E[y2(4)] | 403.9 |
| E[y2(5)] | 343.7 |
| E[y2(6)] | 130.5 |
| E[y2(7)] | 65.0 |
| E[y2(8)] | 41.3 |
| E[y2(9)] | 119.3 |
| E[y2(10)] | 44.2 |
| E[y2(11)] | 22.0 |
| E[y2(12)] | 14.0 |
| E[y2(13)] | 69.2 |
| E[y2(14)] | 26.3 |
| E[y2(15)] | 13.1 |
| E[y2(16)] | 8.3 |

Furthermore, according to the results of the averaged powers of transformed coefficients, rearrange the scan order for mode 0 in each 4×4 blocks, and the scan order is

| 1 | 2 | 3 | 4 |
|---|---|---|---|
| 5 | 6 | 9 | 11 |
| 7 | 10 | 13 | 14 |
| 8 | 12 | 15 | 16 |

It is noted that the adaptive scan method of the present invention need not to waste bits to signal the scan order for each 4×4 block, because the scan order is dependent on intra prediction mode which has been coded in H.264 intra coding. Furthermore, the proposed method can also be exploited to replace the traditional zig-zag scan proposed in other standard once they take the advantage of adaptive predictions.

While the present invention has been particularly shown and described with reference to the preferred embodiments thereof, these are merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. An adaptive scan method for image/video coding in accordance with the present invention comprising steps of calculating an average power of the transformed coefficients vector and rearranging the powers of the transformed coefficients in descending order in a n×n block of an image according to the power of transformed coefficients, wherein n=2$^m$, and the n and m are positive integers;

the step of calculating an average power of the transformed coefficients vector comprising:
a step of modeling spatial data; and
a step of modeling predictive data;

the step of rearranging the powers of the transformed coefficients in descending order in the n×n block of the image comprising
computing the average power of the transformed coefficients vector; and
according to the calculation results of the average power of the transformed coefficients vector, deriving a scan order for the coefficients in descending order.

2. The adaptive scan method for image/video coding as claimed in claim 1, the step modeling spatial data being based on a 1-D first-order Markov model, a 2-D first-order Markov model and a denoted quantization error of a zero mean Gaussian process.

3. An adaptive scan method for image/video coding comprising steps of
dividing an image into image blocks;
generating a predicted image block for each image block using intra prediction;
transforming a residual block, the residual block being an image block from which the corresponding predicted image block has been subtracted, into a transformed coefficient vector by using an integer discrete cosine transform and a post scaling operation;
generating an average power value for each transformed coefficient vector based on a 2-D first order Markov model;
sorting the average power values in descending order; and
deriving a scan order for each image block according to the descending order of the average power values.

4. The adaptive scan method for image/video coding as recited in claim 3, wherein each image block being encoded for intra-prediction mode 0 of H.264/AVC comprises sixteen pixels arranged sequentially in four rows of four pixels each and the pixels are scanned sequentially with the pixels in the first row scanned first, then the first two pixels in the second row, the first pixel in the third row, the first pixel in the fourth row, the third pixel in the second row, the second pixel in the third row, the fourth pixel in the second row, the second pixel in the fourth row, the third pixel in the third row, the fourth pixel in the third row, the third pixel in the fourth row and the fourth pixel in the fourth row.

* * * * *